United States Patent
Park

(10) Patent No.: US 10,658,938 B2
(45) Date of Patent: May 19, 2020

(54) INITIAL CHARGING SYSTEM FOR MEDIUM-VOLTAGE INVERTER AND METHOD FOR CONTROLLING THE SYSTEM

(71) Applicant: LSIS CO., LTD., Anyang-si, Gyeonggi-do (KR)

(72) Inventor: Jong-Je Park, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 16/111,802

(22) Filed: Aug. 24, 2018

(65) Prior Publication Data
US 2019/0296652 A1 Sep. 26, 2019

(30) Foreign Application Priority Data

Mar. 21, 2018 (KR) .................. 10-2018-0032479

(51) Int. Cl.
*H02P 27/06* (2006.01)
*H02P 25/22* (2006.01)
(Continued)

(52) U.S. Cl.
CPC ........... *H02M 5/4585* (2013.01); *H02M 1/36* (2013.01); *H02M 1/40* (2013.01); *H02M 7/49* (2013.01); *H02P 27/08* (2013.01); *H02H 9/002* (2013.01)

(58) Field of Classification Search
CPC combination set(s) only.
See application file for complete search history.

(56) References Cited

U.S. PATENT DOCUMENTS 6,407,530 B1 6/2002 Kwon et al.
2011/0013441 A1 1/2011 Gruber et al.
(Continued)

FOREIGN PATENT DOCUMENTS

EP 1922794 A1 5/2008
GB 1323441 7/1973
(Continued)

OTHER PUBLICATIONS

Korean Office Action for related Korean Application No. 10-2018-0032479; action dated Apr. 4, 2019; (6 pages).
(Continued)

*Primary Examiner* — Bickey Dhakal
*Assistant Examiner* — Charles S Laughlin
(74) *Attorney, Agent, or Firm* — K&L Gates LLP

(57) ABSTRACT

The present disclosure relates to an initial charging system for a medium-voltage inverter and a method for controlling the system. The initial charging system comprises: a first switch for switching between a medium-voltage inverter and a power supply thereto; a second switch for switching between an output stage of the medium-voltage inverter and an electric motor; a first initial charging unit disposed between and connected to the first switch and the medium-voltage inverter for limiting an initial excitation current to be applied to the phase-shift transformer; and a second initial charging unit disposed between and connected to an input stage of each power cell and the direct current (DC) link capacitor for limiting an initial charging current in the direct current (DC) link capacitor.

9 Claims, 5 Drawing Sheets

(51) Int. Cl.
  *H02P 3/22*   (2006.01)
  *H02M 5/458*  (2006.01)
  *H02P 27/08*  (2006.01)
  *H02M 1/40*   (2007.01)
  *H02M 7/49*   (2007.01)
  *H02M 1/36*   (2007.01)
  *H02H 9/00*   (2006.01)

(56) References Cited

U.S. PATENT DOCUMENTS

| 2013/0076285 A1* | 3/2013 | Choi | H02M 1/00 |
| | | | 318/453 |
| 2016/0204709 A1* | 7/2016 | Patel | H02M 5/44 |
| | | | 363/37 |
| 2017/0077746 A1* | 3/2017 | Kanakasabai | H02J 9/061 |

FOREIGN PATENT DOCUMENTS

| JP | H09225230 A | 9/1997 |
| JP | 2002354830 A | 12/2002 |
| JP | 2005510192 A | 4/2005 |
| JP | 2006350900 A | 12/2006 |
| JP | 2012100508 A | 5/2012 |
| JP | 2014200169 A | 10/2014 |
| JP | 6018870 B2 | 11/2016 |
| JP | 2017153279 A | 8/2017 |
| KR | 20110135126 A | 12/2011 |

OTHER PUBLICATIONS

Japanese Office Action for related Japanese Application No. 20188-153236; action dated Aug. 13, 2019; (7 pages).

M. Abapour, et al.; A Non-Control Transformer Inrush Current Limiter; Department of Electrical and computer Engineering, University of Tabriz; 2006; (6 pages).

Steimer, et al.; "Converter-Fed Synchronous Machine for Pumped Hydro Storage Plants"; 2014; 7 pages).

European Search Report for related European Application No. 18193072.8; action dated Apr. 8, 2019; (15 pages).

\* cited by examiner

INITIAL CHARGING SYSTEM FOR MEDIUM-VOLTAGE INVERTER AND METHOD FOR CONTROLLING THE SYSTEM

CROSS-REFERENCE TO RELATED APPLICATIONS

Pursuant to 35 U.S.C. § 119(a), this application claims the benefit of earlier filing date and right of priority to Korean Application No. 10-2018-0032479 filed on Mar. 21, 2018, in the Korean Intellectual Property Office, the disclosure of which is hereby incorporated by reference in its entirety.

BACKGROUND

1. Technical Field

The present disclosure relates to an initial charging system for a medium-voltage inverter and a method for controlling the system.

2. Description of the Related Art

A medium-voltage inverter is a high-capacity power conversion device and includes a large transformer at an input stage thereof.

FIG. 1 shows a structure of a typical medium-voltage inverter.

The medium-voltage inverter shown in FIG. 1 includes a transformer 100 and a plurality of power cells 200. A secondary stage of the transformer 100 is connected in series with the power cell 200, such that a high voltage power is output to an electric motor.

Generally, upon initial power input to the transformer 100, an excitation inrush current A (hereinafter referred to as initial excitation current) for initial excitation of the transformer 100 occurs. Thus, in general, an overcurrent of about 7 to 10 times as larger as rated current flows instantaneously. This may be a major factor in increasing a capacity of an electric receiving equipment. Further, momentary overcurrent may cause a reduction in load reliability.

A method for limiting the overcurrent includes a method of increasing impedance of the transformer 100 itself and a method of limiting the current using a separate circuit.

In the voltage-driven inverter of FIG. 1, a direct current (DC) link capacitor is located between a rectifier and an inverter.

FIG. 2 shows configuration of the power cell in FIG. 1. The power cell 200 includes a rectifier 210, an inverter 230, and a direct current (DC) link capacitor 220 disposed therebetween.

When power is first applied to the power cell 200, an instantaneous overcurrent B (hereinafter referred to as 'initial charging current') for charging the direct current (DC) link capacitor 220 flows through the rectifier 210.

This instantaneous overcurrent may damage power electronics of the rectifier 210 (diodes, silicon controlled rectifying elements (SCRs), insulated gate bipolar transistors (IGBTs), etc.). Further, a fuse (not shown) at an input stage thereof may be inadvertently melted and disconnected.

Thus, when the initial power is applied to the medium-voltage inverter, a momentary initial excitation current A flows into a primary stage of the transformer 100, and, then, the voltage is induced at a secondary stage of the transformer 100. When the voltage is induced at the secondary stage of the transformer 100, the direct current (DC) link capacitor 220 of each power cell 200 is charged. Concurrently, an initial charging current B, which is a large charging current, flows instantaneously. That is, when power is applied to the medium-voltage inverter, the initial excitation current A flows in the input stage of the transformer 100, and, at the same time, the initial charging current B flows in the input stage of the power cell.

A typical medium-voltage inverter employs a scheme that limits only the initial excitation current of the transformer 100, or limits only the initial charging current of the direct current (DC) link capacitor 220. Therefore, a technique for appropriately limiting both of the initial excitation current and the initial charging current is required.

SUMMARY

The present disclosure provides an initial charging system for a medium-voltage inverter, which is configured for limiting both the initial excitation current and the initial charging current simultaneously, such that the double inrush currents flowing in the inverter are limited concurrently, thereby to improve reliability of the medium-voltage inverter.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In a first aspect of the present disclosure, there is provided an initial charging system for a medium-voltage inverter, wherein the medium-voltage inverter includes a phase-shift transformer and a plurality of power cells, wherein each power cell includes a rectifier for rectifying power input from the transformer, and a direct current (DC) link capacitor for smoothing a voltage received from the rectifier, wherein the initial charging system comprises: a first switch for switching between the medium-voltage inverter and a power supply thereto; a second switch for switching between an output stage of the medium-voltage inverter and an electric motor; a first initial charging unit disposed between and connected to the first switch and the medium-voltage inverter for limiting an initial excitation current to be applied to the phase-shift transformer; and a second initial charging unit disposed between and connected to an input stage of each power cell and the direct current (DC) link capacitor for limiting an initial charging current in the direct current (DC) link capacitor.

In one embodiment of the first aspect, the first initial charging unit includes: a third switch disposed at a first path defining a serial connection between the power supply and the medium-voltage inverter for switching between the power supply and the medium-voltage inverter; a reactor disposed at a second path defining a parallel connection between the third switch and the reactor; a fourth switch disposed at the second path and connected in series with the reactor.

In one embodiment of the first aspect, an upper leg of the rectifier includes a silicon-controlled rectifying element (SCR), wherein the second initial charging unit includes: a first resistor; and a first diode connected in series with the first resistor.

In a second aspect of the present disclosure, there is provided a method for controlling the initial charging system, wherein the method comprises: transmitting a turn-on signal to the first switch; when the first switch is in an on state, transmitting a turn-on signal to the fourth switch; when a direct current (DC) voltage of the direct current (DC) link capacitor reaches a preset value to allow the upper leg of the rectifier to turn on, and, then, after a predetermined delay time, transmitting a turn-off signal to the fourth switch; transmitting a turn-on signal to the third switch at a predetermined time before transmitting the turn-off signal to the fourth switch; and when the third switch is at on state and the fourth switch is at an off state, transmitting a turn-on signal to the second switch.

In one embodiment of the second aspect, the method further comprises: transmitting a turn-off signal to the second switch; when, at an off state of the second switch, the direct current (DC) voltage of the direct current (DC) link capacitor reaches the preset value to allow the upper leg of the inverter to turn off, transmitting a turn-off signal to the third switch; and when the third switch is at an off state, transmitting a turn-off signal to the first switch.

In one embodiment of the first aspect, the second initial charging unit includes: a fifth switch; a second resistor serially connected with the fifth switch; and a second diode connected in series with the second resistor.

In a third aspect of the present disclosure, there is provided a method for controlling the initial charging system, wherein the method comprises: transmitting a turn-on signal to the first switch; when the first switch is at an on state, transmitting a turn-on signal to the fourth switch and transmitting a turn-on signal to the fifth switch; when a direct current (DC) voltage of the direct current (DC) link capacitor reaches a preset value, transmitting a turn-off signal to the fifth switch; transmitting a turn-off signal to the fourth switch at a predetermined delay time after the fifth switch has been into an on state; transmitting a turn-on signal to the third switch at a predetermined time before transmitting the turn-off signal to the fourth switch; and when the third switch is in an on state and the fourth switch is in an off state, transmitting a turn-on signal to the second switch.

In one embodiment of the third aspect, the method further comprises: transmitting a turn-off signal to the second switch; when, at an off state of the second switch, the direct current (DC) voltage of the direct current (DC) link capacitor reaches the preset value, transmitting a turn-off signal to the third switch; and when the third switch is at an off state, transmitting a turn-off signal to the first switch.

In a fourth aspect of the present disclosure, there is provided an initial charging system for a medium-voltage inverter, wherein the medium-voltage inverter includes a phase-shift transformer and a plurality of power cells, wherein each power cell includes a rectifier for rectifying power input from the transformer, and a direct current (DC) link capacitor for smoothing a voltage received from the rectifier, wherein the initial charging system comprises: a first switch for switching between the medium-voltage inverter and a main power supply thereto; a second switch for switching between an output stage of the medium-voltage inverter and an electric motor; and an initial charging unit connected in parallel with the first switch for limiting an initial excitation current to be applied to the phase-shift transformer.

In one embodiment of the fourth aspect, the initial charging unit includes a third switch disposed a first path defining a series connection between an auxiliary power supply and the medium-voltage inverter for switching between the auxiliary power supply and the medium-voltage inverter, wherein the auxiliary power supply has a lower voltage than a voltage of the main power supply; an initial charging resistor disposed at a second path defining a parallel connection between the third switch and the initial charging resistor; a fourth switch disposed at the second path and connected in series with the initial charging resistor; an initial charging capacitor disposed at a third path defining a parallel connection between the third switch and the initial charging capacitor ; and a fifth switch disposed at the third path and connected in series with the initial charging capacitor.

In a fifth aspect of the present disclosure, there is provided a method for controlling the initial charging system, wherein the method comprises: transmitting a turn-on signal to the fifth switch; when a power at a primary stage of the phase-shift transformer reaches a predetermined ratio, transmitting a turn-on signal to the fourth switch; transmitting a turn-off signal to the fifth switch and transmitting a turn-on signal to the third switch; when a direct current (DC) voltage of the direct current (DC) link capacitor reaches a predetermined level, transmitting a turn-off signal to the fourth switch; when there is no phase difference between the main power supply and the auxiliary power supply, transmitting a turn-on signal to the first switch; and when phase synchronization between the power supply and the auxiliary power supply is completed, transmitting a turn-off signal to the third switch.

The initial charging system for the medium-voltage inverter in accordance with the present disclosure may limit the initial excitation current to the transformer to suppress overcurrent that may otherwise occur during an initial power supply thereto. This may allow a capacity margin of a power receiving stage to be sufficiently secured and may allow a lifespan of the transformer of the medium-voltage inverter to increase. Further, this may lead to no limitation on the number of times of power inputting, which is advantageous in terms of facility operation.

In addition, reliability of the power cell may be secured by limiting the DC link charge current of each power cell. This has an effect of increasing the lifetime of the cell.

This has the effect of ensuring the reliability of the overall medium-voltage inverter system.

Further specific effects of the present disclosure as well as the effects as described above will be described in conduction with illustrations of specific details for carrying out the invention.

DETAILED DESCRIPTION

Figure 1:
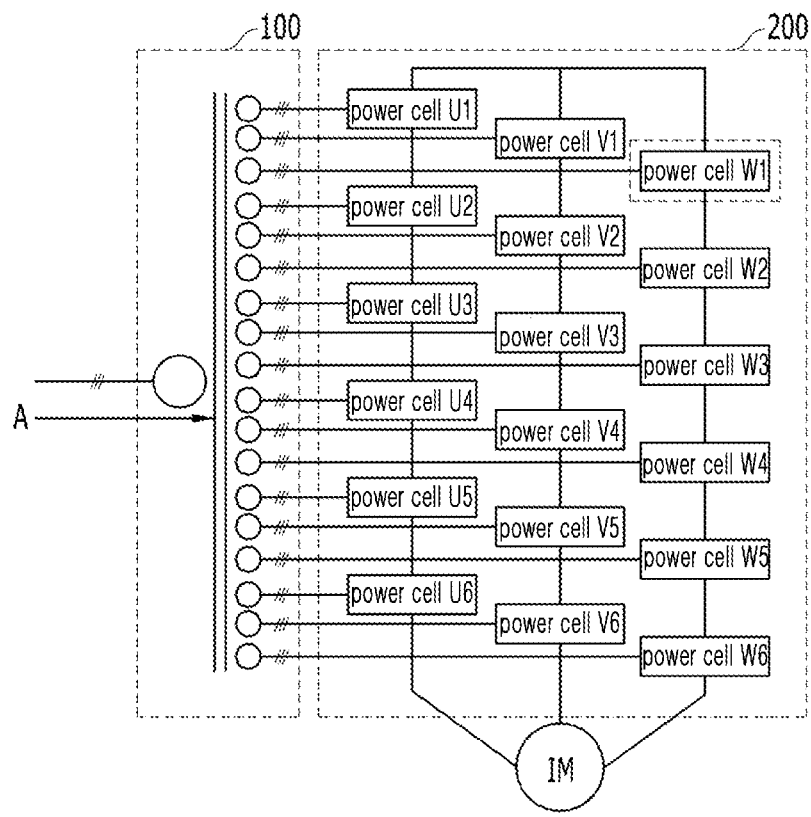
FIG. 1 shows a structure of a typical medium-voltage inverter.
Figure 2:
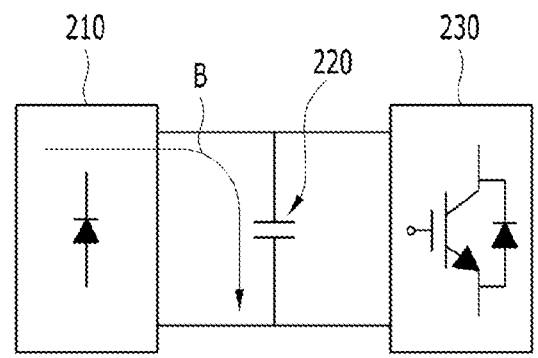
FIG. 2 shows a power cell configuration of FIG. 1.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an initial charging system for a medium-voltage inverter according to one embodiment of the present disclosure and a method for controlling the system will be described with reference to FIGS. 3 to 6.

Figure 3:
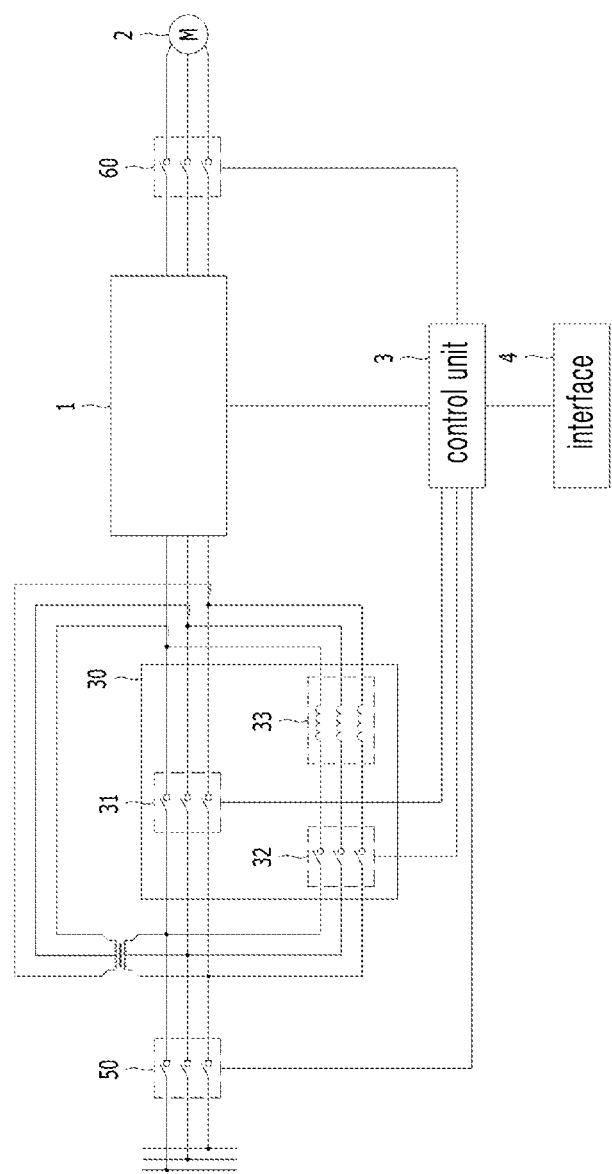
FIG. 3 is a schematic diagram illustrating an initial charging system for a medium-voltage inverter according to one embodiment of the present disclosure.
Figure 4:
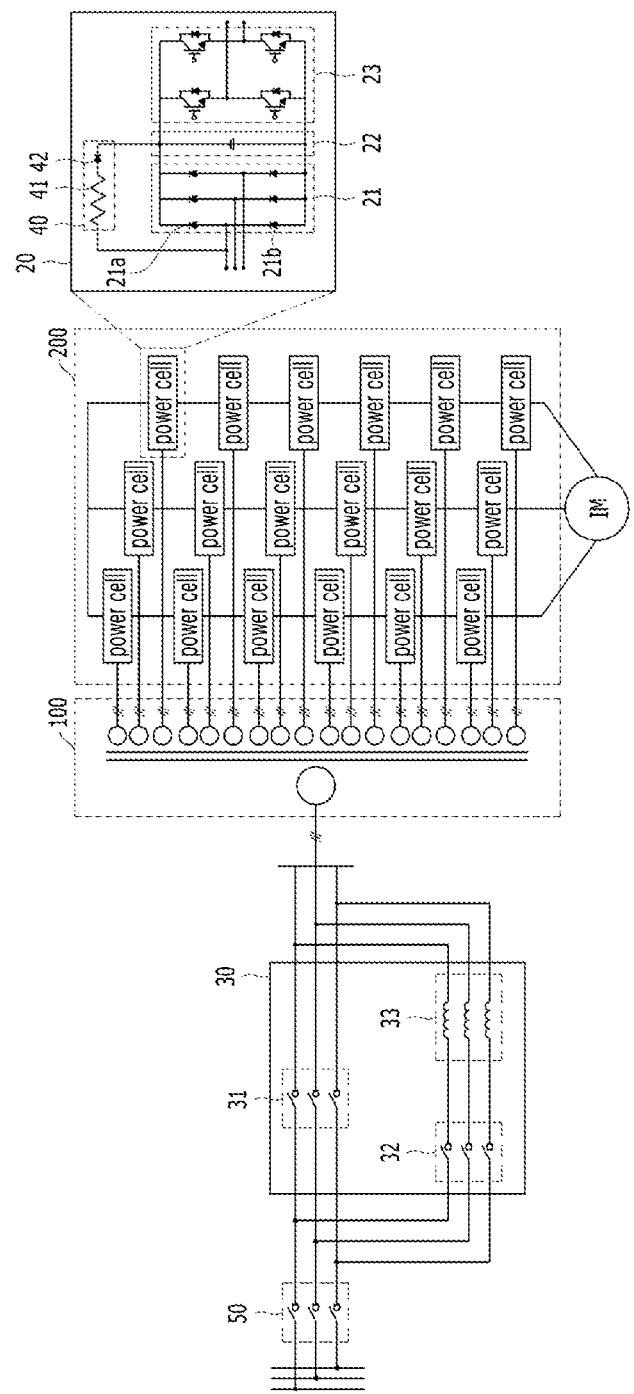
FIG. 4 is a circuit diagram for illustrating an internal configuration of the medium-voltage inverter in FIG. 3.

FIG. 3 is a schematic diagram illustrating an initial charging system for a medium-voltage inverter in accordance with one embodiment of the present disclosure. FIG. 4 is a circuit diagram for illustrating an internal configuration of the medium-voltage inverter in FIG. 3.

Referring to FIG. 4, as for an initial charging system according to one embodiment of the present disclosure, the medium-voltage inverter 1 may include a high-voltage phase-shift transformer 100 and a plurality of power cells 200. Hereinafter, a single power cell will be denoted as '20', while a set of a plurality of power cells will be denoted as '200'.

The phase-shift transformer 100 may allow galvanic isolation between a power supply and the medium-voltage inverter 1. The transformer 100 may reduce harmonics at an input stage of the inverter 1 and provide a phase-shifted 3-phase power to each power cell 20. A phase-shift angle of the phase-shift transformer 100 may be determined by the number of the power cells 20. Phase shift angles of the phase-shift transformers 100 respectively connected to the power cells 20 may be different from each other.

The power cell set 200 may receive power from a set of phase-shift transformers 100 and output a motor phase voltage to an electric motor 2. The power cell set 200 may be grouped into three groups. In each group, the power cells 20 connected in series may synthesize a single-phase voltage among a three-phase (W, U, V) voltage to be applied to the electric motor 2. In this connection, a synthesized V-phase voltage and a synthesized U-phase voltage may have a phase difference of 120 degrees. A W phase voltage and the V phase voltage may also have a phase difference of 120 degrees.

The power cell 20 may include a rectifier 21, a direct current (DC) link capacitor 22, and an inverter 23.

The rectifier 21 may be configured to receive and rectify a 3-phase power from the transformer 100. The rectifier 21 includes a first rectifying element 21a disposed as an upper leg and a second rectifying element 21b disposed as a lower leg. The rectifier 21 may include three pairs of upper and lower legs for rectifying the three-phase AC power supplied from the transformer 100. In each pair, the first and second rectifying elements 21a, 21b may be connected in series with each other.

In one embodiment of the present disclosure, the first rectifying element 21a may be implemented as a silicon-controlled rectifier (SCR) while the second rectifying element 21b may be implemented as a diode. However, the present disclosure is not limited thereto. Various types of rectifying elements may be used as the first and second rectifying elements.

The direct current (DC) link capacitor 22 may smooth and store the voltage as rectified by the rectifier 21.

The inverter 23 may perform switching based on control of a control unit (not shown) and may output AC power to be synthesized for application to the electric motor 2.

In one embodiment of the present disclosure, the inverter may include switching elements configured in a full-bridge scheme. The present disclosure is not limited thereto. Alternatively, the inverter may include switching elements configured in a half-bridge scheme. Alternatively, the inverter may include switching elements configured in an NPC (neutral point clamped) scheme. Alternatively, the configuration of the inverter 23 may have various topologies based on its output characteristics.

Although not shown, the power cell 20 may further include a cell control unit for controlling the inverter 23. Data may be transmitted and received between the cell control unit and a control unit 3 of the present system to be illustrated later. To this end, the cell control unit and the control unit 3 may be connected through a wired or wireless network. The cell control unit may transmit a DC link voltage of the direct current (DC) link capacitor 22 over the network.

A system according to one embodiment of the present disclosure, including the medium-voltage inverter 1 may include: a first initial charging unit 30 connected to a front end of the medium-voltage inverter 1 for outputting a 3-phase voltage to the electric motor 2, wherein the unit 30 may be configured for limiting an initial excitation current to be applied to the transformer 100 of the medium-voltage inverter 1; a second initial charging unit 40 disposed in each power cell 20 of the medium-voltage inverter 1 to limit an initial charging current of the direct current (DC) link capacitor 22; a first switch 50 connected to a front end of the first initial charging unit 30 to switch between a high voltage power supply and the first initial charging unit 30; and a second switch 60 connected to a rear end of the medium-voltage inverter 1 to switch between the medium-voltage inverter 1 and the electric motor 2.

In one embodiment of the present disclosure, a single second initial charging unit 40 corresponding to one power cell 20 is illustrated in the figure. It may be obvious that a plurality of second initial charging units 40 may be disposed in the plurality of power cells 200 of the medium-voltage inverter 1 respectively.

The first initial charging unit 30 may include a third switch 31 disposed at a series connection path between the power supply and the medium-voltage inverter 1 for switching between the power supply and the medium-voltage inverter 1, a fourth switch 32 connected in parallel to the third switch 31; and an initial charging reactor 33.

When the fourth switch 32 is turned on and the third switch 31 is turned off, power of a high voltage from the power supply is not directly applied to the medium-voltage inverter 1, but, the initial charging reactor 33 limits the current applied to the medium-voltage inverter 1. As a result, the initial excitation current may be limited.

The second initial charging unit 40 may be disposed between the front end of the rectifier 21 of the corresponding power cell 20 and the direct current (DC) link capacitor 22. The second initial charging unit 40 may include a resistor 41 and a diode 42 connected in series with each other. The second initial charging unit 40 charges the direct current (DC) link capacitor 22 before power is applied to the rectifier 21. When the direct current (DC) link capacitor 22 has been charged by the second initial charging unit 40 to have a charge ratio above a predetermined charge ratio, the first rectifying element 21a may be turned on, and, thus, the rectifier 21 may start rectification of the power to be input to the corresponding power cell 20. To this end, as described above, the first rectifying element 21a may be implemented as, for example, SCR.

In this way, when the direct current (DC) link capacitor 22 has been charged by the second initial charging unit 40 to have a charge ratio above a predetermined charge ratio, the first rectifying element 21a may be turned on. Thus, a separate switch is not required in the second initial charging unit 40 so that the initial charging circuit having a simple circuit configuration may be realized.

In one embodiment of the present disclosure, the first switch 50, the second switch 60, the third switch 31, and the fourth switch 32 may be implemented, for example, as a circuit breaker (CB). The present disclosure is not limited thereto. Various power switches may be used as the first switch 50, the second switch 60, the third switch 31, and the fourth switch 32.

The initial charging system according to one embodiment of the present disclosure may include a control unit 3 for controlling initial charging of the medium-voltage inverter 1. To this end, the control unit 3 may provide a turn-on or turn-off control signal to the first switch 50, the second switch 60 and the third switch 31 and the fourth switch 32 of the first initial charging unit 30. The system may also include an interface 4 for monitoring the medium-voltage inverter 1. The interface 4 may be a human-machine interface (HMI). The present disclosure is not limited thereto. Various type of interfaces may be used for the interface 4.

The control unit 3 outputs a turn-on control signal (hereinafter referred to as a "turn-on signal") or a turn-off control signal (hereinafter referred to as a "turn-off signal") to the first switch 50, the second switch 60, the third switch 31, and the fourth switch 32 of the first initial charging unit 30. Thereby, the initial charging operation of the initial charging system according to one embodiment of the present disclosure may be controlled. This initial charging operation will be exemplified referring to the drawings.

Figure 5:
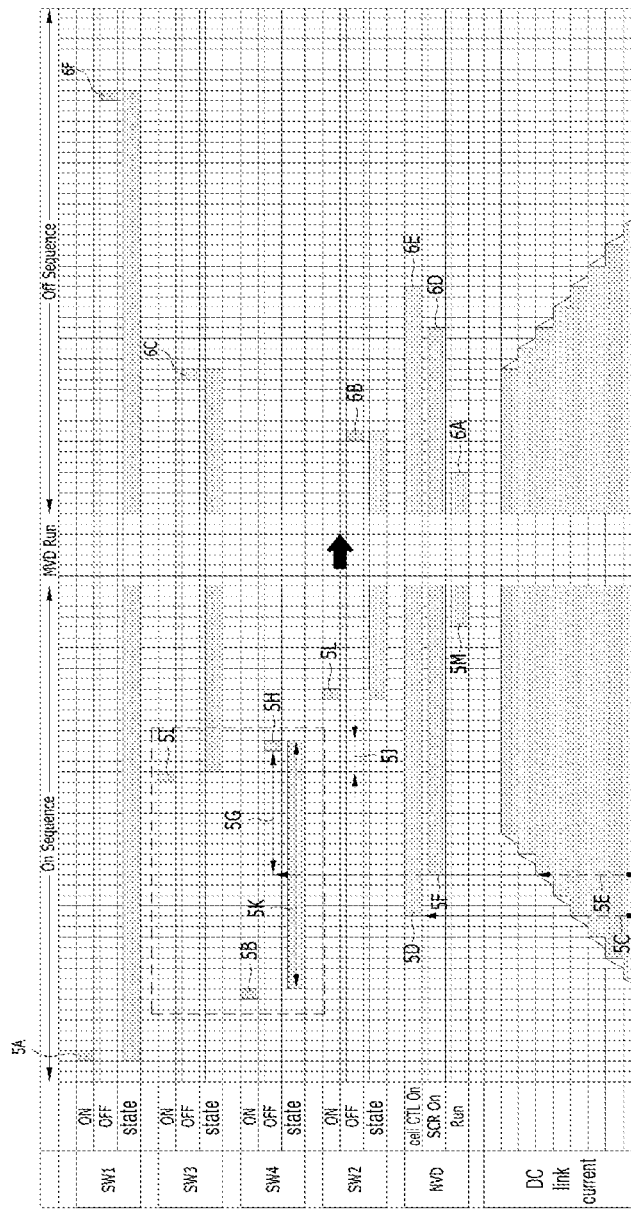
FIG. 5 shows an example of an on/off sequence of first to fourth switches according to a control of a control unit of FIG. 3.

FIG. 5 shows an example of an on/off sequence of first to fourth switches according to control of the control unit of FIG. 3.

The control unit 3 may send a turn-on signal 5A to the first switch 50 to operate the system. At this time, the second switch 60, the third switch 31, and the fourth switch 32 are all in an OFF state. Thus, driving of the present system may in a ready state.

When the user sends a turn-on command (not shown) to the medium-voltage inverter 1 via the interface 4, the control unit 3 transmits a turn-on signal 5B to the fourth switch 32. As a result, the transformer 100 starts to be magnetized via the initial charging reactor 33. The ON state of the fourth switch 32 may allow a voltage to be induced in the secondary stage of the transformer 100. The direct current (DC) link capacitor 22 begins to charge via the current limiting resistor 41 of the second initial charge unit 40 in each power cell 20.

When the direct current (DC) voltage reaches a first preset value 5C, a CTL terminal as a terminal for determining a pulse width modulation (PWM) control of the inverter 23 of the power cell 20 is turned on (5D). When the direct current (DC) voltage reaches a second preset value 5E, the first rectifying element 21a of the rectifier 21 of the power cell 20 is turned on so that the initial charging of the direct current (DC) link capacitor 22 is completed. In one embodiment of the present disclosure, the first preset value 5C of the direct current (DC) voltage may be, for example, about 50% of a direct current (DC) full-charge voltage. The second preset value 5E, for example, may be about 85% of the direct current (DC) full-charge voltage. However, the present disclosure is not limited thereto. The first and second preset values may vary based on an operating environment (a load, etc.) via the interface 4 from the user.

Then, when the direct current (DC) voltage reaches the second preset value 5E, and after a predetermined delay time 5G has elapsed, the control unit 3 may transmit a turn-off signal 5H to the fourth switch 32. The delay time 5G may be preset by the user, which may be, for example, in a range of 3 to 5 seconds.

Thereafter, at a predetermined time before the control unit 3 transmits the turn-off signal 5H to the fourth switch 32, the control unit may transmit a turn-on signal 5I to the third switch 31. Thus, the third switch 31 may be turned on.

When the control unit 3 sends the turn-on signal 5I to the third switch 31 prior to the transmission of the turn-off signal 5H to the fourth switch 32, the ON states of the fourth switch 32 and the third switch 31 may overlap for a predetermined time. The overlap may prevent the direct current (DC) voltage drop, which may, otherwise, occur when the fourth switch 32 and the third switch 31 are simultaneously switched from the OFF state to the ON state. The duration (i.e., an overlap period) 5J during which the ON states of the fourth switch 32 and the third switch 31 overlap with each other may be preset and may be, for example, 100 ms.

The period during which the fourth switch 32 is turned on may be an initial charging period, which may be, for example, in a range of 8 to 10 seconds.

The initial charge period may be determined based on the direct current (DC) voltage of the power cell 20. However, capacitances of the direct current (DC) link capacitors 22 may not be uniform between the plurality of power cells 20. For this reason, the control unit 3 may receive a direct current (DC) voltage of each of a plurality of power cells 20 from each cell control unit and display the received voltage on the interface 4 to the user. This allows the user to adopt the smallest DC voltage as a reference direct current (DC) voltage. That is, the smallest direct current (DC) voltage may be the second preset value. Thus, the control unit may count the delay time 5G since the direct current (DC) voltage reaches smallest direct current (DC) voltage. Then, after the time 5G has lapsed, the control unit may transmit the turn-off signal 5H to the fourth switch 32. However, the present disclosure is not limited thereto. An average value between the direct current (DC) voltages of a plurality of power cells may be employed as the reference direct current (DC) voltage.

When the initial charge is completed in this manner, the medium-voltage inverter 1 is in a drive-ready state. The control unit 3 sends the turn-on signal 5L to the second switch 60. The time at which the control unit 3 transmits the turn-on signal 5L to the second switch 60 and the time at which the control unit 3 transmits the turn-off signal 5H to the fourth switch 43 may coincide with each other. Alternatively, both times may differ by a predetermined time delay.

In this state, an on-drive signal for the medium-voltage inverter 1 may be supplied thereto from the user (5M). Thus, the medium-voltage inverter 1 may start driving. In this way, the on-sequence may be terminated and, then, the medium-voltage inverter 1 may be driven.

Hereinafter, an off-sequence by the control unit 3 will be illustrated.

When an off-drive signal for the medium-voltage inverter 1 from the user terminates driving of the medium-voltage inverter 1 (6A), the control unit 3 may transmit the turn-off signal 6B to the second switch 60 and then transmit the turn-off signal 6C to the third switch 31. Points in time at which the control unit 3 transmits the turn-off signals 6B and 6C after the termination (6A) of the drive of the medium-voltage inverter 1 may be determined based on the capacity of the inverter 1. First and second delay times may be may preset. In this connection, when the predetermined first delay time has elapsed after the termination (6A) of the drive of the medium-voltage inverter 1, the control unit 3 may send the turn-off signal 6B to the second switch 60. Thereafter, when the predetermined second delay time has elapsed, the control unit 3 may send the turn-off signal 6C to the third switch 31.

The direct current (DC) voltage of the power cell 20 gradually decreases due to the off state of the third switch 31. When the direct current (DC) voltage reaches the second preset value, the first rectifying element 21a of the rectifier 21 may be turned off (6D) and the CTL terminal of the power cell 20 may be turned off (6E). Then, when the direct current (DC) voltage becomes 0, and, then, after a predetermined time, the control unit 3 sends a turn-off signal 6F to the first switch 50. This may bring the medium-voltage inverter to in a complete stop state.

The initial charging system for the medium-voltage inverter in accordance with the present disclosure may limit the initial excitation current to the transformer to suppress overcurrent that may otherwise occur during an initial power supply thereto. This may allow a capacity margin of a power receiving stage to be sufficiently secured and may allow a lifespan of the transformer of the medium-voltage inverter to increase. Further, this may lead to no limitation on the number of times of power inputting, which is advantageous in terms of facility operation. In addition, reliability of the power cell may be secured by limiting the DC link charge current of each power cell.

In one embodiment of the present disclosure, an example in which the transformer 100 is magnetized via the initial charging reactor 33 in the first initial charging unit 30 has been illustrated. However, the present disclosure is not limited thereto.

Figure 6:
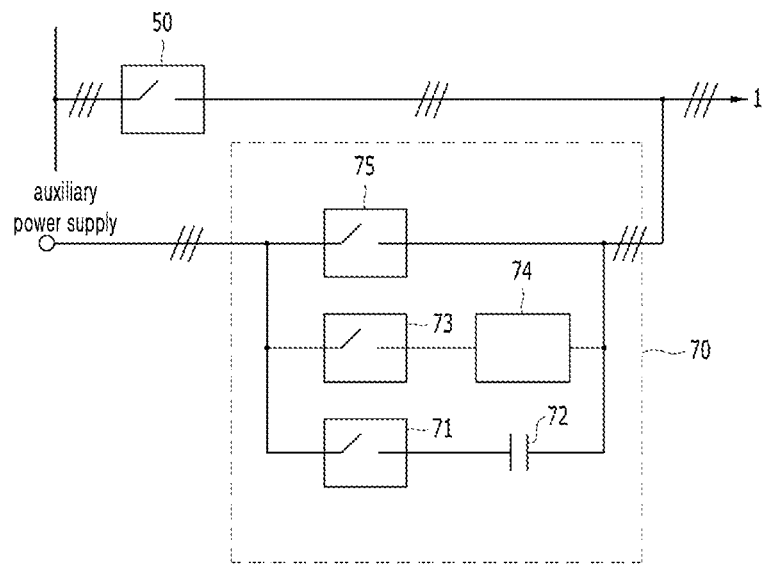
FIG. 6 is a circuit diagram for illustrating a first initial charging unit in accordance with another embodiment of the present disclosure.

FIG. 6 is a circuit diagram for illustrating the first initial charging unit according to another embodiment of the present disclosure.

In FIG. 6, for simplicity of illustration, a three-phases power is expressed as a single power.

As shown in the figure, the first initial charging unit 70 according to another embodiment of the present disclosure may include a fifth switch 71, an initial charging capacitor 72, a sixth switch 73, an initial charging resistor 74, and a seventh switch 75.

Unlike the previous embodiment of FIG. 4, in this embodiment of the present disclosure, the first initial charging unit 70 may not be connected to the high voltage power supply but may be connected to an auxiliary power supply having a lower voltage (for example, in a range of 480 to 690 V) than that of the high voltage power supply.

When the control unit 3 transmits a turn-on signal to the fifth switch 71, power may be induced in a primary stage of the transformer 100 via LC resonance between the initial charging capacitor 72 and a reactor in the primary stage of the transformer 100. When the primary stage power of the transformer 100 reaches a predetermined ratio (e.g., 90%), the control unit 3 may transmit a turn-on signal to the sixth switch 73. Thus, the primary stage power of the transformer 100 of the inverter 1 may be maintained.

The control unit 3 may then transmit a turn-off signal to the fifth switch 71 and, at the same time, a turn-on signal to the seventh switch 75. Thus, initial charging of the direct current (DC) link capacitor 22 of the power cell 20 may be started.

When the direct current (DC) voltage of the direct current (DC) link capacitor 22 reaches the second preset value as described above, the control unit 3 may send a turn-off signal to the sixth switch 73. In this connection, the second preset value may be the same as in the above-defined example, and a description thereof will be omitted.

The control unit 3 then monitors power phases of the high voltage power supply and the low voltage auxiliary power supply. When there is no difference between the power phases of the high voltage power supply and the low voltage auxiliary power supply, the control unit may send a turn-on signal to the first switch 50. At this time, the first switch 50 and the seventh switch 75 are turned on.

Then, when the phase synchronization between the main power supply and the auxiliary power supply is completed, the control unit 3 transmits a turn-off signal to the seventh switch 75 to complete the initial charging. Thereby, the preparation for driving the medium-voltage inverter 1 may be completed.

The first initial charging unit, which limits the initial excitation current of the medium-voltage inverter 1 may be configured using various schemes. Likewise, the second initial charging unit that limits the initial charging current may also be configured in various ways.

Figure 7:
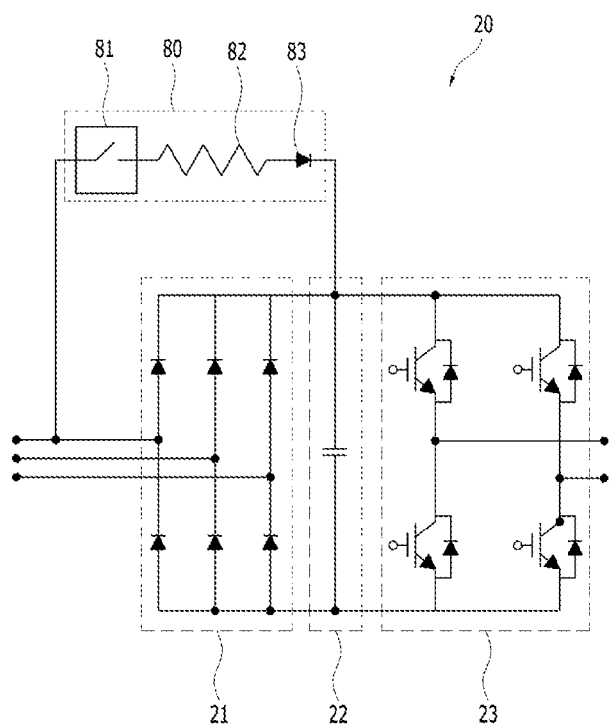
FIG. 7 is a circuit diagram for illustrating a second initial charging unit in accordance with another embodiment of the present disclosure.

FIG. 7 is a circuit diagram for illustrating the second initial charging unit according to another embodiment of the present disclosure.

As shown in the figure, in another embodiment of the present disclosure, rectifying elements corresponding to upper and lower legs of the rectifier 21 may be implemented as the same type of rectifying element (e.g., a diode). The second initial charging unit 80 may include an eighth switch 81, an initial charging resistor 82 and a diode 83.

In the following, differences between this embodiment and the above-described embodiment of FIG. 4 will be described.

In the above-described embodiment of the present disclosure as illustrated with reference to FIG. 4 and FIG. 5, as for the on-sequence, when the direct current (DC) voltage of the direct current (DC) link capacitor 22 reaches the second preset value, the first rectifying element 21a of the rectifier 21 is turned on.

However, in this embodiment of FIG. 7, the control unit 3 transmits the turn-on signal 5B to the fourth switch 33 and at the same time, the turn-on signal to the eighth switch 81 such that the initial charging of the direct current (DC) link capacitor 22 may be started.

Further, in this embodiment, when the direct current (DC) voltage reaches the second preset value, the control unit 3 sends the turn-off signal to eighth switch 81. Thereby, the initial charging of the direct current (DC) link capacitor 22 of the power cell 20 may be completed.

That is, in the embodiment of FIG. 5, the SCR may be automatically turned on, whereas, in this embodiment of FIG. 7, the control unit 3 may transmit the turn-on signal to the eighth switch 81 so that the initial charging state of the power cell 20 may be terminated.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. An initial charging system for a medium-voltage inverter, wherein the medium-voltage inverter includes a phase-shift transformer and a plurality of power cells, wherein each of the plurality of power cells includes a rectifier for rectifying power input from the transformer, and a direct current link capacitor for smoothing a voltage received from the rectifier, wherein the initial charging system comprises:

a first switch for switching between the medium-voltage inverter and a power supply thereto;

a second switch for switching between an output stage of the medium-voltage inverter and an electric motor;

a first initial charging unit disposed between and connected to the first switch and the medium-voltage inverter, wherein the first initial charging unit limits an initial excitation current to be applied to the phase-shift transformer; and a second initial charging unit disposed between and connected to an input stage of each of the plurality of power cells and the direct current link capacitor, wherein the second initial charging unit limits an initial charging current in the direct current link capacitor, wherein the first initial charging unit includes:

a third switch disposed at a first path defining a serial connection between the power supply and the medium-voltage inverter for switching between the power supply and the medium-voltage inverter;

a reactor disposed at a second path defining a parallel connection between the third switch and the reactor; and a fourth switch disposed at the second path and connected in series with the reactor.

2. The initial charging system of claim 1, wherein an upper leg of the rectifier includes a silicon-controlled rectifying element (SCR), wherein the second initial charging unit includes:

a first resistor; and a first diode connected in series with the first resistor.

3. A method for controlling the initial charging system of claim 2, wherein the method comprises:

transmitting a turn-on signal to the first switch;

when the first switch is at an on state, transmitting a turn-on signal to the fourth switch;

when a direct current (DC) voltage of the direct current (DC) link capacitor reaches a preset value to allow the upper leg of the rectifier to turn on, and, then, after a predetermined delay time, transmitting a turn-off signal to the fourth switch;

transmitting a turn-on signal to the third switch at a predetermined time before transmitting the turn-off signal to the fourth switch; and when the third switch is at an on state and the fourth switch is at an off state, transmitting a turn-on signal to the second switch.

4. The method of claim 3, wherein the method further comprises:

transmitting a turn-off signal to the second switch;

when, at an off state of the second switch, the direct current voltage of the direct current (DC) link capacitor reaches the preset value to allow the upper leg of the rectifier to turn off, transmitting a turn-off signal to the third switch; and when the third switch is at an off state, transmitting a turn-off signal to the first switch.

5. The initial charging system of claim 1, wherein the second initial charging unit includes:

a fifth switch;

a second resistor serially connected with the fifth switch; and a second diode connected in series with the second resistor.

6. A method for controlling the initial charging system of claim 5, wherein the method comprises:

transmitting a turn-on signal to the first switch;
when the first switch is at an on state, transmitting a turn-on signal to the fourth switch and transmitting a turn-on signal to the fifth switch;
when a direct current (DC) voltage of the direct current (DC) link capacitor reaches a preset value, transmitting a turn-off signal to the fifth switch;
transmitting a turn-off signal to the fourth switch at a predetermined delay time after the fifth switch has been into an on state;
transmitting a turn-on signal to the third switch at a predetermined time before transmitting the turn-off signal to the fourth switch; and
when the third switch is at an on state and the fourth switch is at an off state, transmitting a turn-on signal to the second switch.

7. The method of claim 6, wherein the method further comprises:
transmitting a turn-off signal to the second switch;
when, at an off state of the second switch, the direct current (DC) voltage of the direct current (DC) link capacitor reaches the preset value, transmitting a turn-off signal to the third switch; and
when the third switch is at an off state, transmitting a turn-off signal to the first switch.

8. An initial charging system for a medium-voltage inverter, wherein the medium-voltage inverter includes a phase-shift transformer and a plurality of power cells, wherein each of the plurality of power cells includes a rectifier for rectifying power input from the transformer, and a direct current (DC) link capacitor for smoothing a voltage received from the rectifier, wherein the initial charging system comprises:
a first switch for switching between the medium-voltage inverter and a main power supply thereto;
a second switch for switching between an output stage of the medium-voltage inverter and an electric motor; and
an initial charging unit connected between an auxiliary power supply and the medium-voltage inverter, wherein the initial charging unit limits an initial excitation current to be applied to the phase-shift transformer,
wherein the initial charging unit includes:
a third switch disposed at a first path defining a series connection between the auxiliary power supply and the medium-voltage inverter for switching between the auxiliary power supply and the medium-voltage inverter, wherein the auxiliary power supply has a lower voltage than a voltage of the main power supply;
an initial charging resistor disposed at a second path defining a parallel connection between the third switch and the initial charging resistor;
a fourth switch disposed at the second path and connected in series with the initial charging resistor;
an initial charging capacitor disposed at a third path defining a parallel connection between the third switch and the initial charging capacitor; and
a fifth switch disposed at the third path and connected in series with the initial charging capacitor.

9. A method for controlling the initial charging system of claim 8, wherein the method comprises:
transmitting a turn-on signal to the fifth switch;
when a power at a primary stage of the phase-shift transformer reaches a predetermined ratio, transmitting a turn-on signal to the fourth switch;
transmitting a turn-off signal to the fifth switch and transmitting a turn-on signal to the third switch;
when a direct current voltage of the direct current link capacitor reaches a predetermined level, transmitting a turn-off signal to the fourth switch;
when there is no phase difference between the main power supply and the auxiliary power supply, transmitting a turn-on signal to the first switch; and
when phase synchronization between the power supply and the auxiliary power supply is completed, transmitting a turn-off signal to the third switch.

* * * * *